(12) United States Patent
Caffa et al.

(10) Patent No.: US 11,524,882 B2
(45) Date of Patent: Dec. 13, 2022

(54) ACTUATION UNIT FOR A CAPPING HEAD AND CAPPING HEAD USING IT

(71) Applicant: AROL S.P.A., Canelli (IT)

(72) Inventors: Marco Caffa, Cortemilia (IT); Marco Cipriani, Alpignano (IT); Marco Forno, Asti (IT); Diego Amerio, Castelnuovo Calcea (IT)

(73) Assignee: AROL S.P.A., Canelli (IT)

( * ) Notice: Subject to any disclaimer, the term of this patent is extended or adjusted under 35 U.S.C. 154(b) by 725 days.

(21) Appl. No.: 16/470,871

(22) PCT Filed: Dec. 21, 2017

(86) PCT No.: PCT/IB2017/058288
§ 371 (c)(1),
(2) Date: Jun. 18, 2019

(87) PCT Pub. No.: WO2018/116241
PCT Pub. Date: Jun. 28, 2018

(65) Prior Publication Data
US 2020/0087129 A1  Mar. 19, 2020

(30) Foreign Application Priority Data
Dec. 23, 2016  (IT) ......................... 102016000130755

(51) Int. Cl.
*B67B 3/20* (2006.01)
*H02K 7/06* (2006.01)
*H02K 16/00* (2006.01)

(52) U.S. Cl.
CPC ............. *B67B 3/2066* (2013.01); *H02K 7/06* (2013.01); *H02K 16/00* (2013.01); *H02K 2201/18* (2013.01)

(58) Field of Classification Search
CPC .......... B65B 7/2835; B67B 3/28; B67B 3/20; B67B 3/2066; B67B 3/26; H02K 7/06;
(Continued)

(56) References Cited

U.S. PATENT DOCUMENTS

| 6,871,482 | B2 | 3/2005 | Cirio |
| 6,925,897 | B2 | 8/2005 | Cirio |

(Continued)

FOREIGN PATENT DOCUMENTS

| CN | 204057907 U | 12/2014 | |
| EP | 2733830 A1 * | 5/2014 | ............. H02K 16/00 |

(Continued)

*Primary Examiner* — Stephen F. Gerrity
*Assistant Examiner* — Linda J Hodge
(74) *Attorney, Agent, or Firm* — Howson & Howson LLP

(57) ABSTRACT

An actuation unit for a capping head for the application of caps on containers or bottles, as well as to a capping head using such a unit, are provided. The actuation unit for a capping head for the application of caps on containers or bottles comprises at least two actuators, of which a first actuator is adapted to impart a translational displacement along a closing axis and a second actuator is adapted to impart a rotational movement about the closing axis, each actuator of the at least two actuators causing the rotation of a first shaft and a second shaft, respectively, both arranged coaxial to the closing axis, and is characterized in that the shafts of the at least two actuators are placed side by side along the axis and are mutually connected by means of at least one rotation decoupling joint.

7 Claims, 4 Drawing Sheets

(58) Field of Classification Search
CPC .... H02K 16/00; H02K 2201/18; H02K 7/003; H02K 1/28
USPC .................................................. 53/317, 331.5
See application file for complete search history.

(56) References Cited

U.S. PATENT DOCUMENTS

| | | | |
|---|---|---|---|
| 7,347,032 B2 | 3/2008 | Cirio | |
| 7,353,643 B2 | 4/2008 | Cirio | |
| 7,377,085 B2 | 5/2008 | Cirio | |
| 7,533,590 B2 | 5/2009 | Cirio | |
| 7,647,746 B2 | 1/2010 | Ueda et al. | |
| 7,685,796 B2 | 3/2010 | Capelli et al. | |
| 8,439,413 B2 | 5/2013 | Cirio | |
| 8,561,377 B2 | 10/2013 | Cirio | |
| 9,266,706 B2 | 2/2016 | Forestelli et al. | |
| 9,296,599 B2 | 3/2016 | Forestelli et al. | |
| 9,352,361 B2 | 5/2016 | Cirio | |
| 9,623,990 B2 | 4/2017 | Cirio | |
| 11,121,612 B2 | 9/2021 | Cipriani | |
| 11,121,616 B2 | 9/2021 | Cipriani | |
| 2008/0127611 A1* | 6/2008 | Brown | B67B 3/2066 53/317 |
| 2010/0095636 A1* | 4/2010 | Cirio | B67B 3/2086 53/331.5 |
| 2012/0017539 A1 | 1/2012 | Neufeld et al. | |
| 2012/0247064 A1 | 10/2012 | Forestelli et al. | |
| 2013/0255187 A1* | 10/2013 | Zemlin | B67B 3/28 53/317 |
| 2015/0375890 A1 | 12/2015 | Ruan | |
| 2019/0177145 A1 | 6/2019 | Caffa et al. | |

FOREIGN PATENT DOCUMENTS

| | | | | |
|---|---|---|---|---|
| EP | 2790306 A2 | | 10/2014 | |
| JP | H11-255291 A | | 9/1999 | |
| JP | 2005527436 | * | 9/2005 | |
| WO | WO-2014076722 A1 | * | 5/2014 | ............ F16H 25/20 |

* cited by examiner

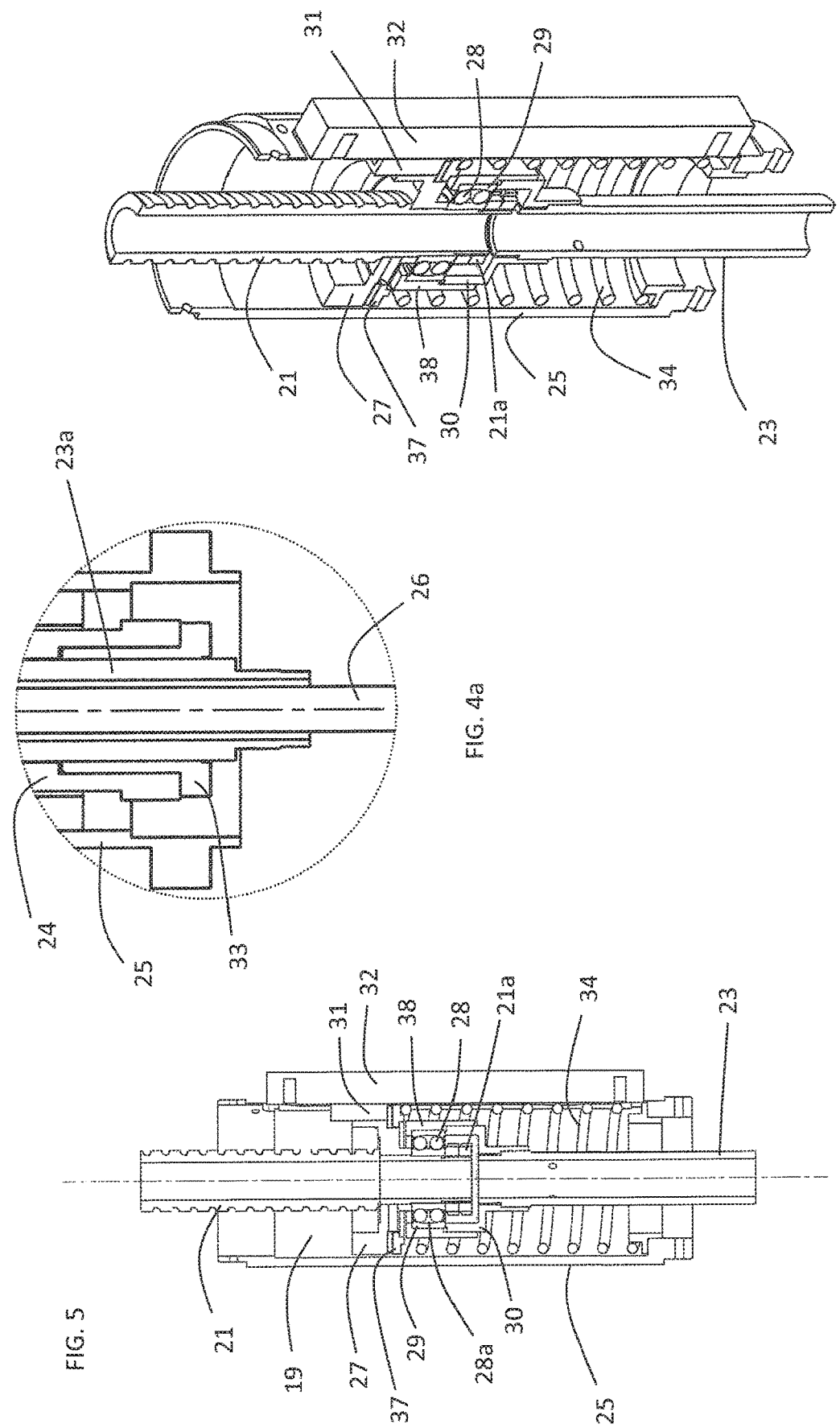

ACTUATION UNIT FOR A CAPPING HEAD AND CAPPING HEAD USING IT

The present invention concerns an actuation unit for a capping head for the application of caps on containers or bottles, as well as a capping head using such a unit. More particularly, the present invention concerns an actuation unit for a capping head, which unit is particularly compact and is characterised by reduced consumptions.

Capping heads are devices allowing tightly sealing a cap or plug on the mouth of containers or bottles, for instance of the kind intended for containing foodstuffs such as beverages. Capping heads are usually employed in capping assemblies, also referred to as "capping machines", generally including a movable support moving a plurality of capping heads, generally mounted on the periphery of the same support, by following a path along which also the containers to be capped are conveyed.

More particularly, during the advance movement performed by the movable support, capping heads are also made to vertically translate in order to reach the position of the mouth of the container to be capped and then to be lifted again once capping is over. Moreover, in case of screw-capping, capping heads are also made to rotate in order to tightly seal the cap on the container mouth.

To this end, capping units are presently employed the translation which is guided through a mechanical cam extending along the whole advance path over which the movable support moves. Each capping head is equipped with a small roller constrained to slide in the mechanical cam and to follow the profile thereof, thereby causing the translation of the remaining head components. The rotation is instead applied to the cap gripping means through an electrical actuator, more particularly a rotary or linear brushless motor, generally arranged off-axis relative to the capping axis.

With such a configuration, the action of the cam necessarily results in a constant lifting and lowering of the whole structure, thereby moving also the actuator causing rotation. That system hence has a dynamic behaviour characterised by considerable and frequent inertial actions, resulting in increased power consumption as well as in a greater wear intrinsic in constantly moving heavy weights. Moreover, the need arises to make a suitable displaceable cabling which does not hinder such movements.

Furthermore, using an off-axis rotary motor does not allow performing a direct actuation, thereby introducing positioning inaccuracies and clearances. The actuation unit has therefore in the whole a complex structure, which is subjected to considerable wear and which is intrinsically affected by high power consumptions as well as by operating inaccuracies.

In order to build an actuation unit for capping heads dispensing with constantly moving the actuator causing the rotation, document U.S. Pat. No. 7,647,746 discloses a solution using a rotary motor applied to a recirculating ball screw, capable therefore of simultaneously driving a rotational and a translational movement.

However, the solution disclosed in U.S. Pat. No. 7,647,746 does not allow independently controlling both movements, since the translation is determined by the pitch of the thread of the screw made to rotate by the motor. Thus, in order to adjust the torque, the solution disclosed in U.S. Pat. No. 7,647,746 uses a magnetic clutch interposed between the actuator and the cap gripping means.

A second solution, known from document US 2015/0375890, uses a pair of rotary actuators coaxial with the capping axis and having concentric shafts, thereby providing an additional degree of freedom of the control. The outer shaft causes the rotation of the gripping means, whereas the inner shaft ends with a threaded portion coupled with a nut rotating together with the gripping means. By setting a suitable difference between the rotation speeds of the two shafts, it is possible to obtain a relative translation between the inner shaft and the nut, and hence a translation of the gripping means, The Applicant has realised that such a solution, while keeping the actuators stationary, still requires driving the translational and rotational movements in manner that is not wholly independent, since translation is determined by a difference in the rotation speeds of the two actuators.

The same document US 2015/0375890 describes other embodiments and states that such embodiments are operable in less complex manner thanks to the independence between the axial and rotational movements. Yet, such embodiments do not have a compact structure, since the two actuators are positioned side by side and their axial movements are driven through external gears or lifting mechanisms which, in practice, result in doubling the overall size of the actuating unit.

Thus, the problem upon which the invention is based is to provide an actuation unit for a capping head which is capable of operating by keeping the actuators stationary while allowing independently driving the rotational and translational movements.

Within such a problem, it is an object of the present invention to conceive an actuation unit for a capping head having a structure that is simple and compact and that can be made at limited costs.

In particular, it is another object of the present invention to make an actuation unit for a capping head which is capable of being easily maintained in an aseptic condition.

In accordance with a first aspect thereof, the invention concerns therefore an actuation unit for a capping head for the application of caps on containers or bottles including at least two actuators, of which a first actuator is adapted to impart a translational displacement along a closing axis and a second actuator is adapted to impart a rotational movement about the closing axis, each actuator of the at least two actuators causing the rotation of a first and a second shaft, respectively, both arranged coaxially to the closing axis, characterized in that the shafts of the at least two actuators are placed side by side along the axis and are mutually connected by means of at least one rotation decoupling joint.

The Applicant has realised that, through the particular arrangement of the actuator shafts, jointly with the rotational decoupling thereof, it is possible to achieve a solution in which the rotational and translational movements can be independently driven, thereby considerably simplifying the control with respect to the prior art solutions.

Moreover, the resulting actuation unit has a compact configuration in which the actuators are not made to translate. Thus, an overall saving in power consumption, weight and overall size is obtained.

In accordance with a second aspect thereof, the invention concerns a capping head for the application of caps on containers or bottles, including at least an actuation unit and cap gripping means connected below the actuating unit and arranged to grip and internally retain a cap for conveying such a cap in correspondence of a container to be capped and tightly sealing the cap onto said container, the head being characterised in that the actuation unit is made as described above.

Advantageously, the capping head according to the invention attains the technical effects described above in connection with the actuation unit for a capping head for the application of caps on containers or bottles.

The present invention may have at least one of the following preferred features, which can be in particular combined together at will in order to cope with specific application requirements.

Preferably, the decoupling joint is fixedly constrained between the two shafts in respect of the axial translation relative to both shafts.

In this manner, it is advantageously ensured that the translational movement applied by the first actuator to the first shaft is also transferred to the second shaft of the second actuator.

Preferably, the first shaft of the first actuator is located above the decoupling joint and the second shaft of the second actuator is located below the decoupling joint, the second shaft ending at its top in a box-shaped portion in which the decoupling joint is retained and which is open upwards in order to allow insertion of the first shaft.

More preferably, the box-shaped portion is joined to the second shaft, preferably through a threaded connection.

In the alternative, the box-shaped portion is integral with the second shaft.

More preferably, the decoupling joint includes a double ball bearing fixedly connected to both shafts through a threaded ferrule housing retained within the box-shaped end portion of the second shaft.

Even more preferably, such a box-shaped portion is coupled to an upper cover through a treaded coupling.

Advantageously, the box-shaped portion and the upper cover define a seat for retaining the bearing that can be disassembled, thereby making disassembling of the actuation unit particularly easy, since the two shafts can be independently removed.

Even more preferably, the threaded ferrule housing is screwed on the first shaft of the first actuator at an abutment portion thereof, located at the bottom end portion of the first shaft.

Advantageously, in this manner, the decoupling joint is retained between the wall of the box-shaped portion and the abutment portion of the first shaft, thereby effectively preventing an axial translation thereof relative to the shafts.

More preferably, the decoupling joint includes an orientable bearing.

Advantageously, this enables a minimum relative orientation between both shafts in order to allow recovering misalignments, if any, due to the clearances of the different elements forming the actuating unit.

In the alternative, the decoupling joint is of magnetic type and includes a pair of concentric magnets.

Preferably, resilient means suitable to ensure an upward return of both shafts in case of deactivation of the first actuator are axially interposed between the first and second actuator.

In the alternative, the resilient means suitable to ensure an upward return of the two shafts in case of deactivation of the first actuator are arranged above the first actuator or below the second actuator.

In this manner, an emergency upward return in case of failure of the first actuator is ensured.

Preferably, the second shaft of the second actuator comprises a first movable part of which the upper end is connected to the decoupling joint and the lower end is provided with a grooved portion having radial grooves extending parallel to the closing axis, and a second hollow part fixed in respect of the axial translation and shaped in complementary manner to the grooved portion of the first part, the first part being constrained to slide inside the second part of the second shaft of the second actuator under the action of the first actuator, the second part integrally carrying a rotor of the second actuator and causing rotation of the first part.

In the present description and in the claims that follow, the term "rotor" denotes both a rotor with permanent magnets and a ferromagnetic rotor having a configuration suitable to transfer a rotation torque.

More preferably, a connecting member radially interposed between the first and the second part of the shaft is provided, which member is adapted to allow a relative axial translation between both parts while causing relative rotation thereof.

Even more preferably, the connecting member is a grooved bushing.

Advantageously, in this manner, the second shaft is made at least partially as a translating shaft, in order to transfer at the output of the unit the translation applied to the first shaft by the first actuator and transmitted to the second shaft through the decoupling joint.

In the alternative, the second shaft of the second actuator is made as a single piece axially slidable under the action of the first actuator, the second shaft integrally carrying a rotor of the second actuator, the rotor having an axial extension greater than a stator of the second actuator.

Advantageously, in this embodiment, the whole shaft is a translating shaft, whereby it has an even simpler structure that is not subjected to clogging. Actually, such a solution allows a contactless transfer of the rotational movement and can also compensate small axial variations, besides improving the performance since it lacks grooved coupling components. This results in a further reduction of the degree of structural complexity of the whole unit, besides maintaining the function of transferring at the output the translation applied by the first actuator.

Preferably, the first shaft comprises:
a hollow tubular body with axis parallel to the closing axis and comprising at least an internally threaded portion, the hollow tubular body integrally carrying a rotor of the first actuator; and
a rolling screw accommodated inside the hollow tubular body and coupled to the at least one internally threaded portion through a screw-nut coupling.

More preferably, the rolling screw is a recirculating ball screw or a roller screw or a threaded roller screw.

More preferably, the hollow tubular body includes a nut element fixedly connected thereto and forming the internally threaded portion.

In the alternative, the internally threaded portion is directly formed on the hollow tubular body.

The screw—nut coupling advantageously enables using a rotary actuator, thereby transforming the rotational movement imparted by the actuator into a translational movement.

The control provided by the rotary actuator advantageously enables applying an adjustable axial load, thereby dispensing with use of a compensation spring and enabling a continuous adjustment of the position and the load at the same time.

Preferably, the rolling screw is connected to anti-rotation means adapted to prevent the rolling screw from rotating about its own axis, while allowing an axial translation of such a screw.

Advantageously, the anti-rotation means make the rolling screw free to translate only. In this manner, the first actuator acts on a body having only one degree of freedom, whereby it is perfectly capable of controlling the movement thereof.

More preferably, the anti-rotation means are of a type that can be deactivated when a torque exceeding a threshold torque is applied to the rolling screw.

More preferably, the anti-rotation means include at least one magnetic element fixedly connected to the rolling screw and magnetically coupled to a respective magnetic track fixedly constrained according to an arrangement parallel to the closing axis.

Advantageously, when the magnetic element faces the magnetic track, an attraction force between the two elements is generated such as to oppose possible tangential forces which would cause screw rotation.

Yet, the coupling may be so dimensioned that it can be released when it is subjected to a torque equal to the torque generated in case of a sudden deactivation of the first actuator and due to the action exerted because of the load of the resilient means.

In this manner, the relative displacement in tangential direction between such magnetic elements, due to the torque applied because of the action of the resilient means, results in the release of the magnetic coupling, thereby allowing the rotation of the plate and, consequently, of the screw, which therefore is free to axially return upwards.

Moreover, advantageously, once the first actuator has been activated again, the rolling screw, and consequently the magnetic element, are initially made to rotate as long as they reach the angular position in which the magnetic element faces the magnetic track, and the magnetic coupling between both elements is therefore restored without the need for a specific intervention by an operator.

In the alternative, the anti-rotation means include at least one ferromagnetic element fixedly connected to the rolling screw and magnetically coupled to a respective electromagnetic track fixedly constrained according to an arrangement parallel to the closing axis.

More preferably, the anti-rotation means are of a type that can be deactivated upon a deactivation command transmitted to the electromagnetic track.

Preferably, the anti-rotation means include either a plurality of pairs of magnetic elements and tracks or a plurality of pairs of ferromagnetic elements and electromagnetic tracks arranged around the main closing axis.

More preferably, the plurality of pairs of magnetic elements and tracks or the plurality of pairs of ferromagnetic elements and electromagnetic tracks are arranged around the main closing axis according to an asymmetrical angular arrangement.

In this manner, it is advantageously ensured that the magnetic coupling of the anti-rotation means takes place at a univocal angular coupling position.

In the alternative, the plurality of pairs of magnetic elements and tracks or the plurality of pairs of ferromagnetic elements and electromagnetic tracks are arranged around the main closing axis according to a symmetrical angular arrangement.

Preferably, the anti-rotation means include a plate fixedly connected to the rolling screw, the first magnetic element being fixedly connected to the plate.

More preferably, the resilient upward return means act on the plate, a rotation decoupling member being arranged between the resilient means ensuring the upward return and the plate.

Even more preferably, the rotation decoupling member is a fifth wheel.

Preferably, the first shaft of the first actuator and the second shaft of the second actuator are hollow, and ejection means are housed inside them in axially slidable manner.

More preferably, the ejection means are a cap ejection rod.

In the alternative, the first shaft of the first actuator and the second shaft of the second actuator are hollow, and a control member for a pincer is housed inside them.

In the alternative, the first shaft of the first actuator and the second shaft of the second actuator are made as solid shafts.

According to an alternative embodiment, the first actuator is a direct linear motor, preferably a tubular linear motor.

Further features and advantages of the present invention will become more apparent from the following detailed description of some preferred embodiments thereof, made with reference to the accompanying drawings. The different features in the individual configurations can be combined together at will according the preceding description, should the advantages specifically resulting from a particular combination have to be exploited.

In the drawings:

FIGS. 4 and 4a are a plan sectional view of the actuation unit shown in FIG. 1 and an enlarged detail thereof, respectively;

FIGS. 5 and 6 are a plan sectional view and an axonometric sectional view, respectively, of a detail of a second embodiment of the actuation unit for a capping head according to the present invention;

In the following description, for explaining the Figures, the same reference numerals are used to denote constructive elements having the same functions. Moreover, for the sake of clarity of the illustration, it is possible that some reference numerals are not shown in all Figures.

Figure 1:
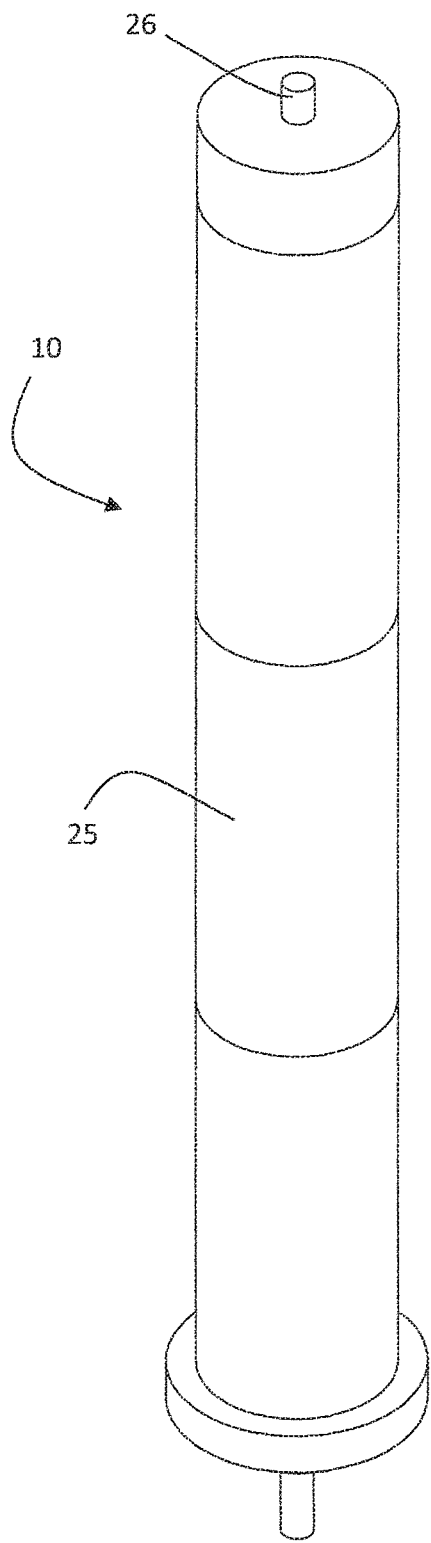
FIG. 1 is an axonometric view of a first preferred embodiment of an actuation unit for a capping head for the application of caps on containers or bottles according to the present invention.
Figure 2:
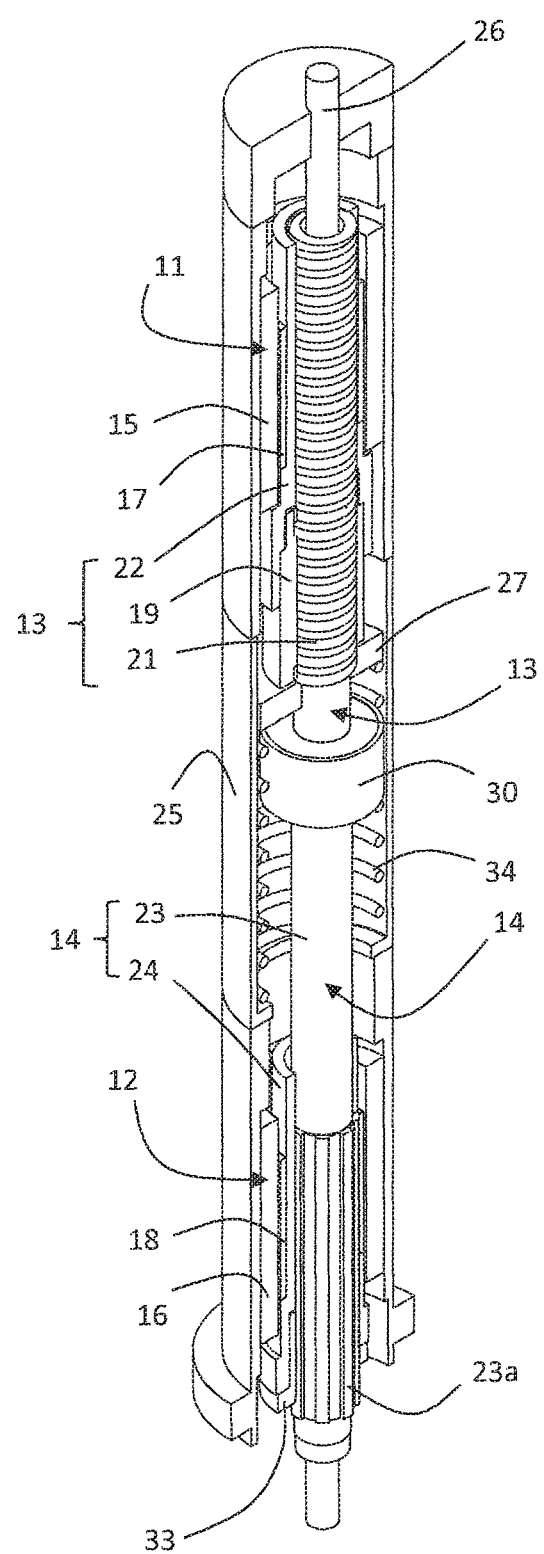
FIG. 2 is a partially open axonometric view of the actuation unit shown in FIG. 1.
Figure 3:
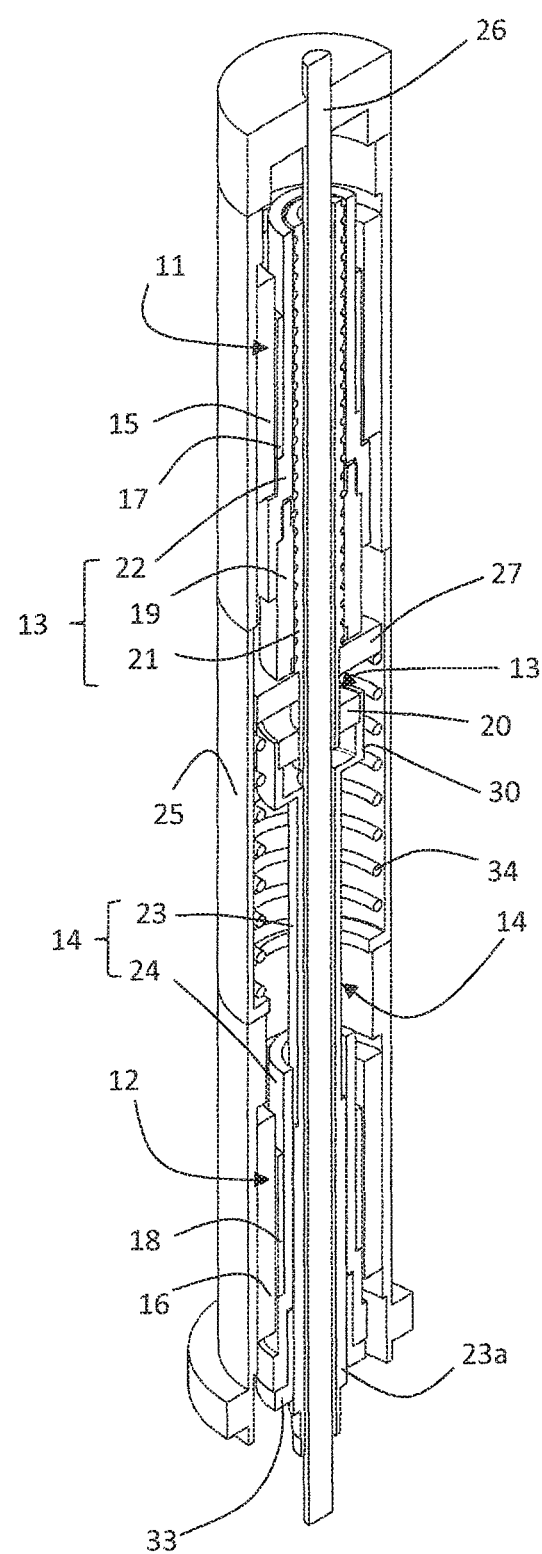
FIG. 3 is a sectional axonometric view of the actuation unit shown in FIG. 1.
Figure 4:
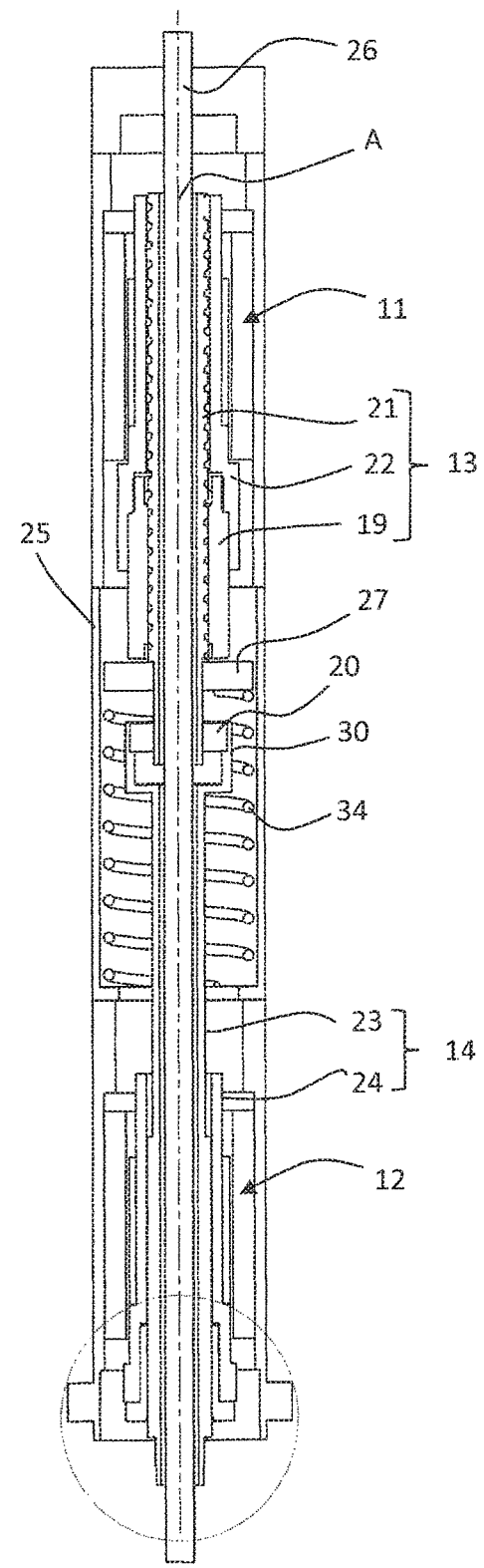

Referring to FIGS. 1 to 4, there is shown a first preferred embodiment of an actuation unit for a capping head for the application of caps on containers or bottles according to the present invention, denoted in the whole by reference numeral 10.

Actuation unit 10 includes a housing 25 inside which two actuators 11, 12 are housed, of which a first actuator 11 is adapted to provide, at the output of actuation unit 10, a translational displacement along a main closing axis A and a second actuator 12 is adapted to provide at the output a rotational movement about closing axis A.

More particularly, in the embodiment shown in FIGS. 1 to 4, housing 25 is formed of several parts, thereby allowing a modular construction of actuation unit 10.

Even if this is not shown, actuation unit 10 is used in association with a capping head including in addition cap gripping means (not shown) connected below actuation unit 10 and adapted to grip and internally retain a cap (not shown) in order to bring it in correspondence of a container to be capped (not shown).

Actuation unit 10 acts on the cap gripping means so as to position and tightly seal the cap on the container mouth through the movements imparted along and about closing axis A.

More particularly, during an exemplary capping cycle, the cap gripping means are first translated downwards along closing axis A in order to reach the container mouth. Subsequently, a rotation of the gripping means takes place in order to tightly screw the cap on the mouth of the container, and lastly the gripping means are translated back upwards along closing axis A in order to become released from the container on which the cap is tightly sealed and to allow taking off the container.

Clearly, other movement sequences combining a rotational and a translational movement are possible depending on the particular capping modality to be implemented.

In addition, actuation unit 10 can act on the gripping means so as to perform also a forced ejection of a cap possibly remaining in the gripping means at the end of the capping operation, or to give a command for opening and/or closing a manipulator and/or a pincer.

Each actuator 11, 12 is a rotary actuator and acts on a respective shaft 13, 14 arranged coaxially to closing axis A. To this end, each actuator 11, 12 includes a respective electromagnetic stator 15, 16, fixedly connected to housing 25 and cooperating with a respective magnetic rotor 17, 18, integrally carried by the corresponding shaft 13, 14.

According to the present invention, shafts 13, 14 of both actuators are superimposed and are mutually connected by means of a rotation decoupling joint 20.

More particularly, shaft 13 of the first actuator 11, or first shaft 13, includes a tubular outer body 22 with axis parallel to closing axis A, fixedly connected to a coaxial internally threaded nut member 19.

The first shaft 13 further includes a recirculating ball screw 21 housed inside outer tubular body 22 and coupled with nut member 19 in such a manner that a rotation of nut member 19 causes a translation of recirculating ball screw 21.

Recirculating ball screw 21 is connected at is lower end to rotation decoupling joint 20, which is to make rotation of the first shaft 13 independent of that of shaft 14 of the second actuator 12, or second shaft 14.

More specifically, decoupling joint 20 is adapted to allow a relative rotation between the second shaft 14 and recirculating ball screw 21 of the first shaft 13, the rotational movement of which is prevented by anti-rotation means. An exemplary embodiment of the anti-rotation means is disclosed in connection with the embodiment shown in FIGS. 5 and 6, which will be referred to in more detail later on.

Moreover, decoupling joint 20 is adapted to connect coaxial shafts 13, 14 so as to prevent a relative translation thereof. This is necessary in order to provide at the output the linear position control imparted by the first actuator 11.

The second shaft 14 is made of two parts and comprises a movable first part 23, which is connected at its upper end to rotation decoupling joint 20 as disclosed above, and is equipped at its lower end with a grooved portion 23a with radial grooves extending parallel to closing axis A.

The first part 23 is constrained to slide inside a second part 24 of shaft 14 of the second actuator 12, carrying magnetic rotor 18. To this end, the second part 24 of the shaft is hollow and is internally provided with grooves complementary to grooved portion 23a of the first part 23.

A connecting member 33, shown in more detail in FIG. 4a, is provided at the bottom end of the second shaft 14, between the first and the second shaft portions 23, 24. That member allows a relative translation between the two portions 23, 24, while causing a mutual rotation thereof. More specifically, in the embodiment shown in FIG. 4a, connecting member 33 is a grooved bushing.

Resilient members 34 adapted to ensure an upward return of shafts 13, 14 in case of deactivation of the first actuator 11 are axially interposed between the first and second actuators 11, 12.

FIGS. 5 and 6 show a second embodiment including a preferred construction of decoupling joint 20, which comprises a double ball bearing 28 connected to both shafts 13, 14 through a threaded ferrule housing 29.

Threaded ferrule housing 29 is screwed on recirculating ball screw 21, it too threaded, in correspondence of an abutment portion 21a of the same screw 21, located at the lower end of screw 21.

Moreover, threaded ferrule housing 29 is housed within a box-shaped portion 30 of the second shaft 14, located at the upper end of the same shaft 14 and joined to the same shaft 14 through a threaded connection.

Box-shaped portion 30 of the second shaft 14 is open upwards in order to allow introduction of the bottom end portion of recirculating ball screw 21 and of the threaded ferrule. Moreover, an upper cover 38 is provided, which is joined to box-shaped portion 30 through a threaded connection so as to define a sealing seat in which threaded ferrule housing 29 is retained together with the bottom end portion of recirculating ball screw 21.

In this manner, decoupling joint 20 is retained between abutment portion 21a of recirculating ball screw 21 and upper cover 38 joined with box-shaped portion 30 of the second shaft 14, whereby it is capable of preventing a relative axial translation of shafts 13, 14.

Double ball bearing 28 acts against the internal walls of box-shaped portion 30 of the second shaft 14, thereby allowing a relative rotation of shafts 13, 14.

According to the preferred construction of decoupling joint 20 shown in FIGS. 5 and 6, the joint includes an orientable bearing 28 such as to allow a minimum relative orientation between shafts 13, 14. To this end, ball seat 28a is rounded.

Referring to FIGS. 5 and 6, there are shown in detail also the anti-rotation means preventing recirculating ball screw 21 from rotating about its axis, while allowing however axial translation thereof relative to external housing 25.

Such means include a plate 27 which is fixedly connected to recirculating ball screw 21 and which is acted upon by resilient means 34. Plate 27 is connected to external housing 25 so as to be axially slidable, but its rotation relative to said external housing 25 is prevented. In this manner, a rotational movement of recirculating ball screw 21 relative to external housing 25 is prevented.

In the preferred embodiment shown in FIGS. 5 and 6, the connection between plate 27 and external housing 25 is obtained by means of an electromagnetic coupling. To this end, a ferromagnetic element 31 is fixedly connected to the periphery of plate 27 and an electromagnetic track 32 is fastened to the inner wall of housing 25 according to an arrangement parallel to axis A.

When ferromagnetic element 31 faces electromagnetic track 32, an attraction force between elements 31, 32 is generated, such as to oppose possible tangential forces which would make screw 21 rotate.

By deactivating electromagnetic track 32, the magnetic coupling between elements 31, 32 fails and screw 21 is free to be screwed in nut member 19, thereby making the axial upward return action easier.

This is particularly advantageous in case of a failure of the first actuator 11, for instance because of an electromechanical failure or in the absence of power supply, thereby allowing shafts 13, 14 to resume the safety position under the action of resilient means 34.

A rotation decoupling member 37, preventing resilient means 34 from being made to rotate by plate 27 when the magnetic coupling fails, is interposed between resilient means 34 and plate 27.

Once power supply to electromagnetic track 32 ha been restored and the first actuator 11 ha been reactivated, the magnetic coupling between elements 31, 32 is automatically restored as soon as ferromagnetic element 31 is moved to the angular position where the corresponding electromagnetic track 32 is located.

Figure 7:
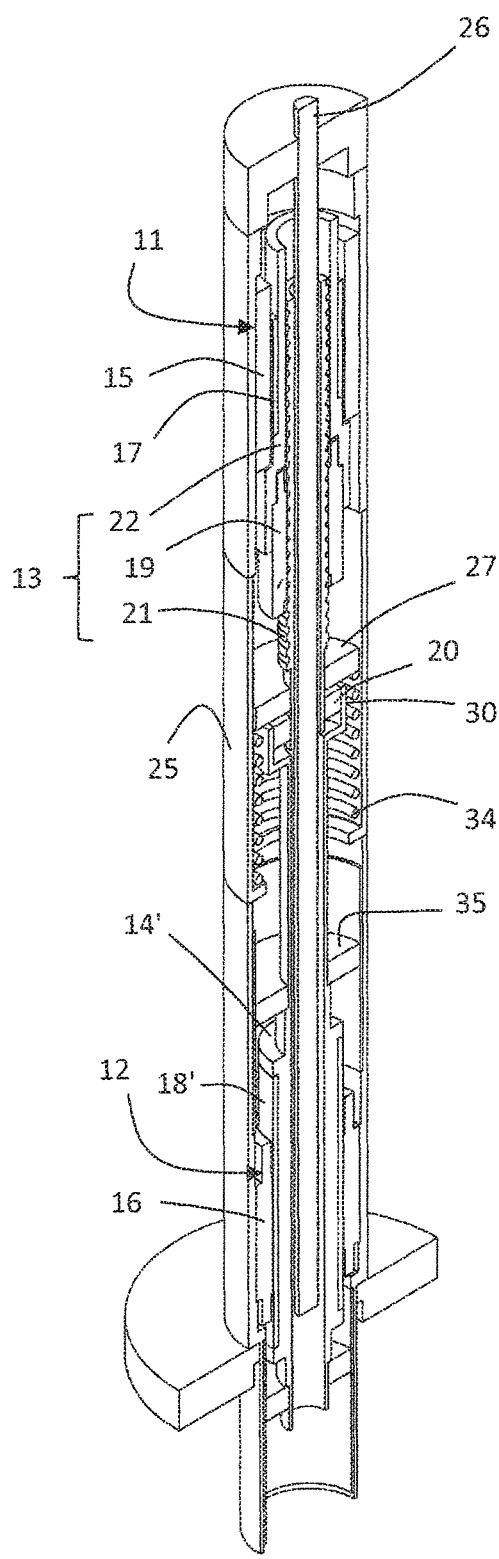
FIGS. 7 and 8 are an axonometric sectional view and a plan sectional view, respectively, of a third preferred embodiment of an actuation unit for a capping head according to the present invention.
Figure 8:
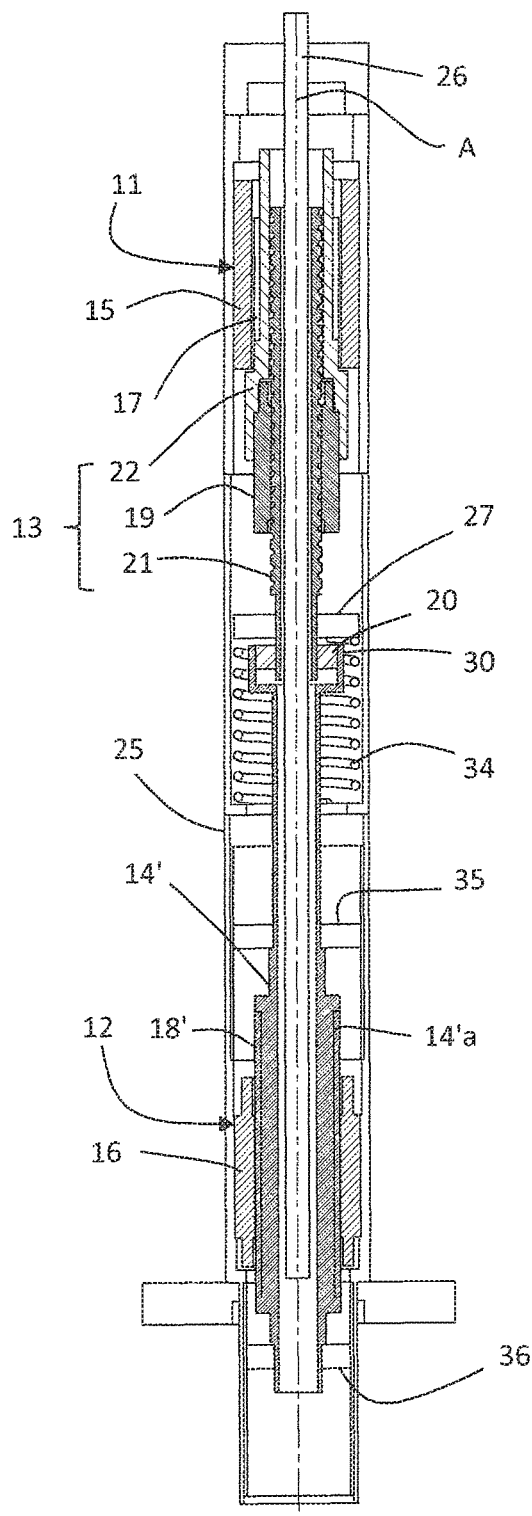

Referring to FIGS. 7 and 8, a third preferred embodiment of an actuation unit 10 is shown, which differs from the first one in that the second shaft 14' is made of a single axially slidable piece.

The second shaft 14' is connected to rotation decoupling joint 20 at its upper end portion 30. To this end, upper end portion 30 has a box-shaped configuration which is open upwards in order to allow passage of recirculating ball screw 21, while internally retaining joint 20.

The second shaft 14' has a portion 14'a on which magnetic rotor 18' coupled with electromagnetic stator 16 of the second actuator is integrally mounted. Magnetic rotor 18' has an axial extension greater than the axial extension of stator 16, whereby stator 16 always faces at least partially rotor 18' independently of the axial position of the latter.

Moreover, two axial guide elements 35, 36 for the second shaft 14' are provided, which act so that said shaft 14' is axially guided and can rotate without frictions and losses.

In all embodiments shown, both shaft 13 of the first actuator 11 and shaft 14 of the second actuator 12 are hollow and a rod 26 is slidable inside them to cause ejection of caps, if any, remaining in the gripping means at the end of the capping operation.

The features of the actuation unit for a capping head for the application of caps on containers or bottles as well as of the corresponding capping head according to the present invention are clearly apparent from the above description, as are clearly apparent the relevant advantages.

Further variants of the embodiments described above are possible without departing from the teaching of the invention.

Lastly, it is clear that an actuation unit for a capping head as conceived can undergo several changes and modifications, all included in the invention. Moreover, all details can be replaced by technically equivalent elements. In practice, any material as well as any size can be used, depending on the technical requirements.

The invention claimed is:

1. An actuation unit (10) for a capping head for the application of caps on containers or bottles, comprising:
at least two actuators (11, 12) of which a first actuator (11) is adapted to impart a translational displacement of a first shaft (13) along a closing axis (A) and a second actuator (12) is adapted to impart a rotational movement about the closing axis (A), each actuator (11, 12) of the at least two actuators (11, 12) causing the rotation of the first shaft (13) and a second shaft (14), respectively, both arranged coaxially to the closing axis (A), wherein the shafts (13, 14) of the at least two actuators (11, 12) are placed side by side along the axis and are mutually connected by at least one rotation decoupling joint (20) and wherein the rotation decoupling joint (20) is fixedly constrained between the two shafts (13, 14) in respect of axial translation of both shafts (13, 14), whereby the translational displacement imparted to the first shaft (13) by the first actuator (11) is transferred to the second shaft (14),
wherein the first shaft (13) of the first actuator (11) is placed above the rotation decoupling joint (20) and the second shaft (14) of the second actuator (12) is placed below the rotation decoupling joint (20), the second shaft (14) having a top end with a box-shaped portion (30) in which the rotation decoupling joint (20) is retained; and
wherein the second shaft (14) of the second actuator (12) comprises a first part (23) of which an upper end is connected to the rotation decoupling joint (20) and a lower end is provided with a grooved portion (23a) with radial grooves that run parallel to the closing axis (A), and a second part (24) fixed with respect to axial translation and shaped in complementary manner to the grooved portion (23a) of the first part (23), the first part (23) being movable and constrained to slide inside the second part (24) of the second shaft (14) of the second actuator (12) under the action of the first actuator (11), the second part (24) being hollow and integrally carrying a rotor (18) of the second actuator (12) and causing rotation of the first part (23).

2. The actuation unit (10) according to claim 1, wherein the rotation decoupling joint (20) comprises an orientable bearing (28) in order to allow a relative orientation between the two shafts (13, 14).

3. The actuation unit (10) according to claim 1, wherein the first shaft (13) comprises:
a hollow tubular body (22) having an axis parallel to the closing axis (A) and comprising at least one portion (19) having an inner thread, the hollow tubular body (22) integrally carrying a rotor (17) of the first actuator (11); and
a rolling screw (21) accommodated inside the hollow tubular body (22) and coupled to the at least one portion (19) having an inner thread thereby providing a screw-nut coupling.

4. The actuation unit (10) according to claim 3, wherein the rolling screw (21) is connected to anti-rotation means (27, 31, 32), adapted to prevent the rolling screw (21) from rotating about its axis, but adapted to allow an axial translation of the rolling screw (21).

5. The actuation unit (10) according to claim 4, wherein, when a torque exceeding a threshold torque is applied to the rolling screw (21), the anti-rotation means (27, 31, 32) is deactivated.

6. The actuation unit (10) according to claim 5, wherein the anti-rotation means (27, 31, 32) comprise at least one magnetic or ferromagnetic element (31) fixedly connected to the rolling screw (21) and magnetically coupled to a respective magnetic or electromagnetic track (32) fixedly constrained along a direction parallel to the closing axis (A).

7. The actuation unit (10) according to claim 4, wherein the anti-rotation means (27, 31, 32) comprise at least one magnetic or ferromagnetic element (31) fixedly connected to the rolling screw (21) and magnetically coupled to a respective magnetic or electromagnetic track (32) fixedly constrained along a direction parallel to the closing axis (A).

* * * * *